April 3, 1962  O. C. ELMER ET AL  3,028,353
COMPOSITION COMPRISING POLYURETHANE RESIN METHYLOL PHENOL
AND FILLER, METHOD OF VULCANIZING SAME, AND
TIRE TREAD THEREFROM
Filed July 16, 1958
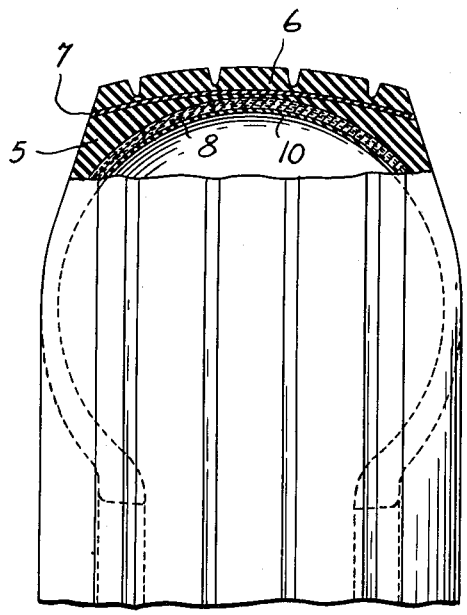
INVENTORS
Otto C. Elmer
Kermit V. Weinstock
BY McCoy, Greene & LeGrotenluis
ATTORNEYS

United States Patent Office 3,028,353
Patented Apr. 3, 1962

3,028,353
COMPOSITION COMPRISING POLYURETHANE RESIN METHYLOL PHENOL AND FILLER, METHOD OF VULCANIZING SAME, AND TIRE TREAD THEREFROM
Otto C. Elmer and Kermit V. Weinstock, Akron, Ohio, assignors to The General Tire & Rubber Company, Akron, Ohio, a corporation of Ohio
Filed July 16, 1958, Ser. No. 748,932
9 Claims. (Cl. 260—38)

The present invention relates to phenolic curing resins, methods of making phenolic curing resins, polyether-urethane compositions and methods of curing same.

Prior to the present invention the use of polyether-urethane rubbers has been somewhat restricted because of the difficulty in curing this material in a practical manner and the lack of suitable curing agents. Peroxide curing agents, such as di-tert-butyl peroxide, dicumyl peroxide or the like, were found to be unsatisfactory for curing certain polyether-urethane rubbers, such as polyisopropylene ether glycols and were somewhat undesirable since they produced disagreeable odors. Other curing agents, such as organic diisocyanates, were undesirable because they cured at temperatures too low to permit storing or calendering and thus caused setting up upon storing at room temperature and scorching upon milling with various compounding agents.

We have discovered that resinous 2,6-dimethylol-3,5-dialkyl substituted phenols produce excellent curing agents for polyether-urethane rubber which cure at high enough temperature to permit normal factory processing. The utilization of standard rubber handling equipment for polyether-urethanes should materially expand the field of use of this type of rubber. Such curing agents do not produce a product with an objectionable odor and permit the making of curable compositions which may be handled in a practical manner. By employing such curing agents, the use of excess polyisocyanate (which is often undesirable because of low temperature curing) may be avoided, and curable polyether-urethane compositions can be made which may be stored for many weeks at room temperature and which can be calendered and worked at temperatures up to 240° F. for sufficiently long periods of time without premature or unwanted vulcanization prior to shaping in a vulcanizing mold. The best cures are obtained with phenolic curing resins such as oil-soluble resole condensation products of 2,6-dimethylol-3,5-dialkyl phenol having 2 to 20 carbon atoms in each alkyl meta substituent. Accelerated cures may be obtained by employing tetrabromophthalic anhydride, 1,3-dibromo-5,5-dimethyl hydantoin, or acid donors such as halogenated paraffin wax, halogenated butyl rubber, halogenated polybutadiene, chlorosulfonated polyethylene, heavy metal halides, heavy metal salts, organic sulfonic acids or the like. Acceleration of the cure by the resole resins is preferably accomplished by reaction of the resins with strong acids such as hydrochloric acid or hydrobromic acid, or by halogenation of the resins. The preferred resins contain about 0.5 to 2% chlorine (or bromine) and contain less than 6 benzene rings per molecule.

An object of the present invention is to provide an effective curing agent for polyether-urethane rubber compositions.

Another object of the invention is to provide a curing agent for polyether-urethane rubber compositions which does not produce disagreeable odors.

A further object of the invention is to provide a method of curing polyether-urethane rubber compositions which permits storage of the curable material at room temperature for long periods of time prior to vulcanization.

A still further object of the invention is to provide improved curing resins which permit fast curing of several dissimilar types of rubber and a method of making such resins.

Other objects of the invention are to provide effective curing agents for rubber compositions which cure at a sufficiently high temperature to permit calendering and extrusion at relatively high temperatures including compositions where blowing agents having a blowing temperature less than the resin curing temperature are incorporated therein to provide cellular rubber products.

These and other objects will be apparent from the specification, claims and appended drawing in which:

FIGURE 1 is a front elevational view of an automobile tire with a fragment broken away and shown in section to illustrate a tread made of polyether-urethane rubber vulcanized according to the present invention.

The present invention relates to the curing of polyurethane rubber with resinous resole-type reaction products of di-meta substituted phenols preferably having hydrocarbon substituents of 3 to 20 carbon atoms. The invention is particularly concerned with oil-soluble thermoplastic resinous 2,6-dimethylol-3,5-dialkyl phenol condensation products having alkyl meta substituents with up to 20 and preferably 3 to 8 carbon atoms. Surprisingly, such condensation products, even though remaining thermoplastic during heating and even though they contain less than 2 equivalent weight of combined aldehyde (preferably formaldehyde) act as curing agents even when not mixed with thermosetting curing agents such as hexamethylene tetramine. Such resinous curing material may be, for example, a thermoplastic condensation product of formaldehyde and either (1) a dimeta-substituted phenol having two open ortho positions (such as 3,5-diisopropyl phenol; 3-tert-amyl-5-isopropyl phenol; 3,4-di-tertiary-butyl phenol, or the like) or (2) the 2,6-dimethylol dialcohol derivative of said dimeta-substituted phenol, (such as 2,6-dimethylol-3,5-diisopropyl phenol; 2,6 - dimethylol - 3 - tert-amyl - 5-isopropylphenol; 2,6-dimethylol-3,5-ditert-butyl phenol; 2,6-dimethylol-3,5-distearyl phenol; 2,6-dimethylol-3-octyl-5-isobutyl phenol; 2,6-dimethylol-3-phenyl-5-tert-butyl phenol; 2,6-dimethylol-3,5-dilauryl phenol; 2,6-dimethylol-3-ethyl-5-isopropyl phenol; 2,6-dimethylol-3,5-diethyl phenol; 2,6-dimethylol-3,5-di-tert-amyl phenol; or 2,6-dimethylol-3,5-diisobutyl phenol). The less expensive phenols such as 3,5-diisopropyl phenol or 5-di-tert-butyl phenol, or similar di-meta-substituted phenols having meta substituents with 3 or 4 carbon atoms, such as 3,5-di-n-propyl phenol; 3,5-di-n-butyl phenol; or 3,5-di-isobutyl phenol are greatly preferred in making the polymeric phenolic curing resins employed in the present invention.

The above meta-substituted phenols are known in the art and many methods of preparing such phenols are understood by those skilled in the art (see, for example, British Patent No. 754,125). A conventional method for preparing the di-meta substituted phenols is to oxidize tri-alkyl benzene, which has been produced by alkylation of benzene using a suitable alkylating agent. For example, 3,5-diisopropyl phenol may be produced economically by bubbling air through sym-triisopropyl benzene.

The meta-substituted phenol is readily converted to a monomeric dimethylol phenol or a polymeric resole-type condensation product using excess aldehyde and an alkaline catalyst as is well understood in the art, for example, by the method described below:

About 1 to 3.5 moles of formaldehyde are reacted with the dimeta-substituted phenol described above in the presence of a strong alkaline catalyst preferably sodium hydroxide or other alkali metal hydroxide, at a temperature preferably from about 75° C. to 125° C. for a period of time preferably from about 15 minutes to 7 or 8 hours, although the reaction will proceed at room temperature, say around 25° C. Higher temperatures are preferably employed as above indicated, and temperatures up to 200° C. may be employed. The reacted mixture is neutralized by adding a suitable acid; hydrochloric acid, sulfuric acid, phosphoric acid and oxalic acid are generally used such as described in the above mentioned British patent. After neutralization the water is removed. The condensation reaction is stopped before substantial crosslinking has occurred to provide the oil-soluble fusible resole-type resin, which is readily soluble in pure hexane or benzene, and is preferably stopped when the average molecular weight of the resinous condensation products corresponds to that of the condensation product of the above dimeta-substituted phenol having less than six benzene rings (when the condensation products have an average of about ½ to 5 benzene rings per molecule and preferably when at least three-fourths of the condensation products have 2 to 5 benzene rings or phenol groups).

The monomeric 2,6-dimethylol-3,5-di-alkyl substituted phenol produced in the aforesaid initial portion of the reaction may be isolated by acidifying the mixture and separating the oily layer but such separation is not necessary. It will be obvious from the above description that the monomeric 2,6-dimethylol-3,5-dialkyl substituted phenol produced and isolated in this manner or produced by any other method may be reacted with formaldehyde to produce a reaction generally the same as the latter part of the reaction described above so as to produce the desired oil-soluble resole resin.

In order to obtain high-quality resins which will cure polyurethanes rapidly, about 1.1 to 2.5 moles of formaldehyde are mixed with each mole of the 3,5-dimeta substituted phenol when performing the method described above. Lower quality resins obtained with more widely varying amounts (i.e., 1 to 3.5 moles of formaldehyde per mole of phenol) of the formaldehyde and phenol will cure polyether urethanes, however.

The resole-type resinous oil-soluble condensation polymers of the monomeric 2,6-dimethylol-3,5-dialkyl phenols used to cure butyl rubber according to the present invention preferably have molecules each containing 2 to 5 benzene rings in a linear-type chain so as to have an average molecular weight not substantially less than twice the molecular weight of the corresponding monomeric phenol and not substantially greater than five times said first-named molecular weight. Such condensation polymers are substantially free of cross linking so as to be soluble in pure hexane, and in such polymers, in commercial resins, usually include a small proportion of monomeric phenols which were not polymerized. Where two meta substituents each contain 3 or 4 carbon atoms as in the preferred curing resins, the average molecular weight of the curing resin is preferably 400 to 1000, and best results are obtained where the percentage of methylol groups is 7 to 15% based on the total weight of the resins. The percentage of methylol groups may, of course, be reduced subsequently by 1 or 2% by halogenation as will be hereinafter described. The alkyl meta substituents of the dimeta substituted phenol used to make the butyl curing resins have at least 2, and preferably 3 carbon atoms, and no more than 20 carbon atoms. For some reason a reduction in the number of carbon atoms in each meta substituent reduces the curing ability of the resin. Satisfactory curing with 2,6-dimethylol-3,5-dimethyl phenol resoles, for example, cannot be had.

When the oil-soluble resole resins made as described above are employed to cure rubber polymers, such as polyether-urethane polymers, it has been discovered that excellent cures may be obtained but that the curing is not as fast as when the rubber mixture contains acid donors. We have discovered that curing is greatly accelerated without decreasing the quality of the product if the oil-soluble resole resins described above are reacted with acids such as hydrochloric acid, and p-toluene sulfonic acid. For example, the resin may be heated with p-toluene sulfonic acid to partially esterify the resin. The derivative produced hardens upon cooling and can be ground to form an excellent acid-catalyzed curing resin.

The meta-substituted resole resins described above may be brominated with liquid bromine or may be chlorinated with concentrated or anhydrous hydrochloric or hydrobromic acid to convert some of the ether linking groups or the methylol groups to halomethyl groups so as to obtained the desired halogen content. The chlorinated resins provide more rapid acid-catalyzed cures. Good results may be obtained when the halogen content is 0.5 to 3% but best results are obtained when the halogen content is 1 to 2%. Such resins provide exceptional results particularly when curing polyalkylene-ether-glycol-diisocyanatepolyurethanes. Chlorine contents greater than 3% do not retard the cure substantially but provide no advantage. Chlorine contents of about 1% by weight provide very good curing resins, 8 parts of such resins curing butyl rubber as fast as about 11 or 12 parts of the same resins which are not halogenated.

About 1 to 15 parts of the above described meta-substitued resins including their halogenated reaction products mixed with 100 parts of polymers provide good cures.

EXAMPLE I

A curing resin is prepared by reacting 1.25 moles of formaldehyde (formalin, 37% solution (2-normal)) with 1 mole of 3,5-diisopropyl phenol having two unoccupied ortho positions at a temperature of 100° C. under alkaline conditions by refluxing the aqueous mixture in the presence of sodium hydroxide for 4 hours to form an oil-soluble resole resin having an average methylol content of approximately 10% by weight and an average molecular weight of 500 to 700 (determined cryoscopically in dioxane). The mixture is then neutralized by adding dilute hydrochloric acid and the water is removed to obtain the dry resinous thermoplastic 2,6-dimethylol-3,5-diisopropyl phenol resole which is soluble in hexane. This resole, identified herein as Resin #222 is a good curing agent and produces faster cures for polyether-urethane rubber compositions than can be obtained with similar resinous 2,6-dimethylol-3,5-diisopropyl phenol resoles such as those formed from 2.5 to 3.5 moles of formaldehyde per mole of 3,5-diisopropyl phenol or those having average molecular weights of 1000–1400.

EXAMPLE II

The resin prepared in Example I (Resin #222) is dissolved in hexane and anhydrous hydrogen chloride gas is bubbled through the solution in a flask cooled with running water at a temperature of about 15° C. for about 50 minutes to obtain a chlorine content of about 1% (which may be determined by weighing the flask and its contents during the hydro-chlorination). The hexane is evaporated on a hot water bath and the excess HCl is removed by blowing with nitrogen gas. The product is then dried in a vacuum oven for 8 hours at 60° C. to obtain the desired 2,6-dimethylol-3,5-diisopropyl phenol curing resin which is identified herein as Resin #333 and which has a chlorine content of approximately 1% and a methylol content between 9 and 12%. This resin will cure polyurethane rubbers much faster than Resin #222 as indicated in Table I.

EXAMPLE III

The resin prepared in Example I (Resin #222) is chlorinated by the same method as in Example II (except that the hydrogen chloride gas is passed through the solution for 90 minutes instead of 50 minutes) to produce a resinous resole having a chlorine content of about 2% and a methylol content of about 9 to 11%. Said resinous resole, which is identified herein as Resin #444 is a better curing agent than Resin #222 but not quite as fast.

The term "polyether urethane" as used in the specification and claims means a polymerization product of long-chain dihydroxy-terminated polyethers, such as polyalkylene ether glycols, having a molecular weight of at least 500, and organic polyisocyanates, such as an organic, diisocyanate or a mixture of isocyanates, as described, for example, in U.S. Patent Nos. 2,692,873 and 2,692,874. The polyisocyanates are preferably aliphatic and/or aromatic such as hexamethylene diisocyanate, p-phenylene diisocyanate and p,p'-diisocyanato diphenyl methane diisocyanates but may be mixtures containing a minor portion of organic triisocyanates such as 4,4',4''-triisocyanato triphenyl methane; 1,3,5-triisocyanato benzene; or 2,4,6-triisocyanato toluene.

The active hydrogen containing polyether is preferably a substantially linear polyalkylene ether glycol having a molecular weight of at least 750 and for best results should be terminated with hydroxyl groups or at least principally with hydroxyl groups although useful products can also be made with a substantial amount of end groups such as amino groups. Examples of polyethers which form the major part by weight of the polyol mixture used in making the rubbery products of the present invention are hydroxy terminated polyethers such as polypropylene ether glycol, polybutylene ether glycol, and polytetramethylene ether glycol. The molecular chain of the polyethers extending between the terminal hydroxyl groups preferably contains only carbon and oxygen atoms as part of the chain itself. It is preferred that the carbon to carbon linkages are not of the aliphatically unsaturated type, since more than minor amounts of unsaturation greatly reduce the weathering properties of the polyether urethanes.

The molecular chains of the polyethers are preferably of the linear long-chain type in which the chains are built of aliphatic groups at least 50% of the polyether chain linkages are preferably aliphatic carbon to carbon links in contrast to cyclic units such as found in cellulose and starch.

While the dimethylol phenol cures of the present invention are applicable to polyurethanes of varying polyisocyanate/polyether equivalent weight ratios of about .9/1 to 1.5/1, the present invention is primarily concerned with polyetherurethanes which have an equivalent weight ratio of about 1:1, that is, those in which the amount of isocyanate is theoretically substantially equal to or only slightly short of that required to react with all of the hydroxyl groups in the polyether material. Those polyurethanes having no substantial excess of isocyanate remain plastic indefinitely, are not scorchy, and may be compounded and stored. When the amount of diisocyanate material is increased substantially above the 1:1 molar ratio of polyether isocyanate, say to about 1.2 equivalent weights of polyisocyanate per equivalent weight of polyether, storageability is generally greatly decreased and scorchiness is greatly increased.

The polyethers used for preparing the improved polyurethane compounds have a molecular weight of at least 600 and preferably more; if materials rubbery at normal temperatures are desired, molecular weights of over 1000 are preferred and best results are obtained when the molecular weight range is 2000 to 3000 although molecular weights as high as 4000–5000 or more may be used.

When the molecular weight of the polyether used for reacting with the isocyanates is less than 500 or 600, the product, while plastic, is too rigid for application as rubbery base materials at ordinary temperatures. However, according to this invention, rigid polyurethanes may be cured. When the polyethers, for example, have molecular weights under 1000 and preferably under 500 to 600, rigid-type linear polyurethanes are formed which may also be advantageously converted to a non-thermoplastic state using the methods of this invention.

Rigid polyurethanes may also be produced by increasing the amount of crosslinking in the resultant polyurethane, for instance, by using a crosslinking agent, such as tri- or polyols, tri- or polyisocyanates or by using polyethers of the crosslinking type.

The preferred polyethers for polyurethane elastomers are polypropylene glycols, mixed poly(ethylene-propylene) ether glycols, and polytetramethylene ether glycol. Desirable properties for the polyethers are very low acid number or no acid number and hydroxyl groups on the ends of the molecular chain.

Examples of suitable polyethers are from the class of polyalkylene ether glycols, such as polyethylene glycol, such as "Carbowax," having a molecular weight of about 1000, polypropylene glycols, polytetramethylene ether glycol, polytrimethylene ether glycol, polyneopentylene ether glycol, polypentamethylene ether glycol, preferably having a molecular weight of about 600 and preferably of about 2000 to 4000 and mixed polyalkylene ether glycols such as poly(ethylene-propylene) ether glycols.

Any reactive aliphatic or aromatic organic polyisocyanate preferably having two and preferably only two readily reactive isocyanate groups may be used for reacting with the polyether, but those having both isocyanate groups of about equal reactivity are preferred for at least part of the total isocyanate present to facilitate growth of the polyurethane chains. Tri-functional polyisocyanates like tri-functional polyethers act as crosslinking agents and are undesirable for flexible articles in appreciable quantity unless one of the functional groups is relatively non-reactive.

Various aliphatic or aromatic diisocyanates are commercially available and the following is a partial list:

(1) 2,4-tolylene-diisocyanate
(2) p,p'-Diisocyanato diphenyl methane
(3) Naphthaline-1,5-diisocyanate
(4) Bi-tolylene diisocyanate
(5) Di-anisidine diisocyanate
(6) Paraphenylene diisocyanate
(7) Metaphenylene diisocyanate
(8) Meta-xylyene diisocyanate
(9) Benzidine diisocyanate
(10) Hexamethylene diisocyanate
(11) Decamethylene diisocyanate The quantities of diisocyanates and polyetherglycol mixture when used in accordance with this invention should be close to a one-to-one molar ratio and preferably about .95 to 1.02 equivalent weights of polyisocyanate per one equivalent weight of polyether (or polyesters as hereinafter described) for best results. When used in this ratio, the resulting polyurethanes have good stability and may be milled and stored indefinitely. Evidence of slight cure or set up can sometimes be observed at very slight excess polyisocyanate over a 1:1 equivalent weight ratio of polyisocyanate to the polyther but the one-to-one molar ratio is the most desirable.

In making the polyurethanes, the diisocyanate and polyethers are mixed together and allowed to polymerize at any suitable temperature, preferably at a temperature of about 115° C. or 100° to 140° C. for a time as short as 15 minutes although 4 to 8 hours is preferred. Polymerization at room temperature requires a much longer time.

A polymerization catalyst may be used such as iron acetonyl acetonate, octyleneglycol titanate, stearyl titanate, and ferrocene (di-cyclopentadienyl iron).

After polymerization, the urethane polymers are further processed preferably by mastication on a Banbury mixer. Other compounding ingredients are mixed into the polyurethane elastomer. After compounding and milling, the elastomers are generally cured for about 10 to 120 minutes at approximately 35 to 60 pounds per square inch steam pressure (280–307° F.). The polyether urethanes thus may be compounded with carbon black, stored and processed with about the same ease as one would experience in processing ordinary rubber compositions.

The polyether urethane compositions are cured with the thermoplastic resole-condensation product of formaldehyde and 3,5-dialkyl phenol. According to the present invention excellent treads for pneumatic tires are obtained, having high tensile strength, good abrasion resistance and good resistance to attack by heat, sunlight and oil. FIGURE 1 shows an automobile tire having a tire carcass 5 composed of natural rubber or GR–S rubber attached to a tread 6 comprising polyalkylene-ether glycol/polyisocyanate elastomer by means of an adhesive layer 7 which is preferably polychloroprene as described in U.S. Patent No. 2,749,960. FIGURE 1 also shows fabric layers 8 comprising a plurality of double bias woven rayon or nylon cords. The tread 6 is preferably a polytetramethylene ether glycol/p,p'-diisocyanato diphenyl methane elastomer cured with a thermoplastic reaction product of formaldehyde and 3,5-diisopropyl phenol in accordance with the present invention.

Also shown in FIGURE 1, is an impervious inner lining 10 of butyl rubber cured according to the present invention. The inner layer of butyl rubber with a condensation product of 3,5-dialkyl phenol and formaldehyde provides an execellent impervious liner on the inner wall of the tire next to the fabric to restrict the diffusion of air into the same.

The polyether-urethane compositions of the present invention contain, per 100 parts of polyether-urethane polymer, 2 to 15 and preferably 3 to 12 parts of the curing resins, up to 100 parts of filler including 20 to 70 parts of reinforcing filler, preferably 0.1 to 2.0 parts of stearic acid, and 0 to 20 and preferably no more than 15 parts of compatible softeners, such as tricresyl phosphate, dioctyl phthalate, diphenyl cresyl phosphate, polypropylene sebacate, paraplex G-35 (Rohm & Haas), or the like, the total number of parts usually being about 140 to 200. About 50 to 70% of the total weight is provided by the polyether-urethane polymer, about 1 to 10% of the total weight is provided by the curing resin, 10 to 30% of the total weight is provided by the reinforcing filler, and usually 0 to 10% of the total weight is provided by the softeners. The 2,6-dimethylol-3,5-dihydrocarbon, substituted phenols may have substituents with 3 to 20 carbon atoms and may be produced by reacting from 1 to 3.5 moles of formaldehyde with each mole of 3,5-dihydrocarbon substituted phenol for a sufficient period of time to produce a resole having an average of 1.5 to 7 phenol groups per molecule. The resins having an average of 2 to 5 phenol groups per molecule are preferred, however.

An excellent curable polyether-urethane rubber composition according to the present invention (identified herein as composition I) may be prepared by mixing 100 parts of a polyether-urethane polymer (such as a long-chain thermoplastic polymerization product of a long-chain polyalkylene ether glycol having a molecular weight of at least 600 with an organic diisocyanate as described above) with 2 to 15 parts of a resinous resole condensation product of formaldehyde and 2,6-dimethylol-3,5-dialkyl phenol having 2 to 20 carbon atoms in each aliphatic substituent (such as Durez S20092 or other 2,6-dimethylol-3,5-diisopropyl phenol condensation product) and 20 to 70 parts of reinforcing filler, such as carbon black, silica, calcium metasilicate, whiting, clay or the like.

Sulfonic Acid Accelerators

Curing of the composition I may be accelerated substantially if the composition contains 1 to 5 parts of an organosulfonic acid per 100 parts of polyether-urethane polymer and preferably about 0.5 to 2% of the total weight of the rubber composition. The acids employed may be aliphatic sulfonic acids, such as methane sulfonic acid, ethane sulfonic acid, propanesulfonic acid or the like; aromatic sulfonic acids such as beta naphthalene sulfonic acid, para toluenesulfonic acid; or mixtures of such acids.

Paraffin Accelerators

Curing of the composition I may also be accelerated substantially if the composition contains per 100 parts of polyether-urethane polymer 3 to 10 parts of halogenated paraffin waxes. Such material may, for example, be obtained by chlorination or bromination of a wax. The halogenated paraffin may be liquid or solid depending on the type and the degree of halogenation. The chlorine or bromine content is preferably from 30 to 60% but may be as high as 75% for solid paraffins. Chlorinated paraffins are well known in the art. Excellent results may be obtained where the composition I contains 3 to 10 parts viscous liquid paraffin waxes, such as of "Chlorafin 42," "Chlorowax 40" or "Chlorowax 50." The latter two waxes are liquid low viscosity paraffin waxes having a chlorine content of about 40% and 50%, respectively.

By adding 1 to 7 parts (per 100 parts of butyl polymer) of a heavy metal oxide, such as iron oxide, zinc oxide, tin oxide, lead oxide, or manganese oxide, or 1 to 7 parts of a heavy metal salt of a fatty acid, such as zinc laurate or zinc stearate, to the composition I in addition to the 3 to 10 parts of halogenated paraffin wax, further acceleration of the cure may be obtained.

Metal Halide Accelerators

Curing of the composition I may be greatly accelerated if the composition contains per 100 parts of polyether-urethane polymer from a few tenths to 5 parts and preferably about 1 to 3 parts of a heavy metal halide, particularly heavy metal chlorides and bromides such as ferric chloride, stannic iodide, aluminum bromide, aluminum chloride, chromium chloride, nickel chloride, cobalt chloride, manganese chloride and copper chloride, aluminum fluoride. The heavy metal chlorides are preferred and particularly stannous chloride and stannic chloride.

Halosulfonated Polythene Accelerators

Curing of the composition I may also be accelerated if it contains per 100 parts of polyether-urethane polymer up to 10 and preferably 1 to 6 parts of chlorosulfonated or bromosulfonated polyethylene. The chlorosulfonated material is well known in the art. The chlorine or bromine content is preferably 20 to 50% by weight.

Excellent results may be obtained by using "Hypalon S-2" which is chlorosulfonated polythene having a molecular weight of 30,000 and containing about 28% chlorine and about 1.5% sulfur. Most of the chlorine is substituted on the hydrocarbon chain, the sulfur being combined with chlorine and oxygen and attached to the hydrocarbon chain as ($SO_2Cl$) groups. There are about 6 or 7 carbon atoms per chlorine atom and about 90 to 130 carbon atoms per sulfonyl chloride group.

By adding 1 to 6 and preferably 2 to 5 parts (per 100 parts of polymer) of a heavy metal oxide, such as iron oxide, zinc oxide, tin oxide, or the like, or 1 to 5 parts of a zinc salt of a fatty acid, such as zinc laurate or zinc stearate to the composition further acceleration may be obtained.

Neoprene Accelerators

Curing of the composition I may be accelerated if the composition contains per 100 parts of polyether-urethane polymer, 1 to 10 parts of polychloroprene and also 1 to 5 parts of zinc oxide or a zinc salt of a fatty acid, such as zinc stearate or zinc laurate.

Halogenated Butyl Accelerators

Curing of the composition I may be accelerated according to another method of the present invention by adding (per 100 parts of polymer) to the composition 1 to 10 parts of a halogenated butyl polymer, such as a polymerization product of isobutylene and from 0.5 to 5% of a copolymerizable conjugated diolefin having from 4 to 8 carbon atoms. The butyl polymer preferably contains 10 to 80% of chlorine or bromine. Excellent results may be obtained with "Hycar 2202" which is a brominated butyl polymer.

Polybutadiene Accelerators

Curing of the composition I may be accelerated by a different method wherein 1 to 10 parts of a halogenated polybutadiene are added to the composition per 100 parts of polyether-urethane polymer. The polybutadiene may be chlorinated or brominated in various ways, for example, by the same process employed to produce the halogenated butyl rubber described above. Such material and the method of making the same is well known in the art. The halogenated polybutadiene used to accelerate the cure may, for example, be "Butarez 15."

EXAMPLE IV

A polyether urethane polymer was prepared using about one mole of a polytetramethylene ether glycol having a molecular weight of 2650 and one mole of a p,p'-diisocyanato diphenyl methane.

The above ingredients were mixed thoroughly and allowed to stand in a suitable container at 115° C. for 16 hours to form a rubbery polyurethane.

EXAMPLE V

In a preliminary test the polymer of Example VII was mixed with the following ingredients on a rubber mill to form a curable polyether-urethane rubber composition:

| | Parts by weight |
|---|---|
| Polyether urethane gum (Example VII) | 100 |
| Medium abrasion furnace carbon black | 60 |
| Stearic acid | 1 |
| Durez S20092 | 12 |

The composition was cured for 45 minutes at 287° F. and was found to have the following properties:

| | | |
|---|---|---|
| 300% modulus | p.s.i. | 600 |
| Tensile strength | p.s.i. | 925 |
| Elongation | percent | 525 |
| Hardness (Shore A) | | 60 |
| Permanent set | percent | 90 |
| Tear strength | p.s.i. | 145 |

The compound was then aged for 6 hours at 300° F. and was thereafter found to have a tensile strength of 2475 and an elongation of 210%, indicating that the main cure took place during the aging period. The original cure was good enough to establish, however, that polyurethanes could be cured with the Durez resin even in the absence of accelerators.

EXAMPLE VI

A series of polyether urethane compositions were prepared, cured and tested according to the formulations shown in Table I. The polyether urethane polymer used was a polytetramethylene ether glycol/p,p'-diisocyanato diphenyl methane polyurethane having a molecular weight of about 2650 and a Mooney viscosity (ML-4) of 50 (polyurethane #555).

As seen in Table I which follows, polyetherurethane compositions AA to WW may be vulcanized at a temperature of 320° F., for 30 to 80 minutes to produce well-cured compounds having good tensile strength and good modulus of elasticity indicating that the di-meta substituted phenol-formaldehyde resins are good curing agents for polyether urethanes. The compositions AA and UU which do not contain accelerators require heating for a longer period of time to obtain a good cure than the other compounds. The compound UU can be cured somewhat faster than the compound AA. Compositions JJ, KK, LL, MM and WW can be cured at the most rapid rate. Very good acceleration can be obtained by adding to composition AA or UU about 2 parts of either 1,3-dibromo (5,5-dimethylhydantoin) or tetrabromo phthalic anhydride.

TABLE I

| Composition | AA | BB | CC | DD | EE | FF | GG | HH | II | JJ | KK | LL | MM | NN | OO | PP | QQ | RR | SS | TT | UU | VV | WW |
|---|---|---|---|---|---|---|---|---|---|---|---|---|---|---|---|---|---|---|---|---|---|---|---|
| Durez | 8 | 8 | 8 | 8 | 8 | 8 | 8 | 8 | 8 | 8 | 8 | 8 | 8 | 8 | 8 | 8 | 8 | 8 | 8 | 8 | 8 | | |
| p-Toluene sulfonic acid | | 1.5 | | | | | | | | | | | | | | | | | | | | | |
| Chlorowax 40 | | | 8 | 7 | | 7 | | 7 | | | | | | | | | | | | | | | |
| Zinc oxide | | | | 4 | | | | | | | | | | 3 | 3 | | | | 4 | | | | |
| Hypalon S-2 | | | | | 3 | | | | | | | | | 3 | | | | | 3 | | | | |
| Zinc stearate | | | | | | | | | | | | | | | | | | 3 | 3 | | | | |
| Zinc laurate | | | | | 4 | | | | | | | | | | | | | | | 4 | | | |
| Alkanesulfonic acid | | | | | | 1.5 | | | | | | | | | | | | | | | | | |
| Zinc chromate | | | | | | | 4 | | | | | | | | | | | | | | | | |
| Hycar 2202 | | | | | | | | 3 | | | | | | | | | | | | | | | |
| Butarez 15 | | | | | | | | | | | | | 6 | | | | | | | | | | |
| Zinc chloride | | | | | | | | | 4 | | | | | | | | | | | | | | |
| Stannous chloride | | | | | | | | | | 1 | | | | | | | | | | | | | |
| Stannic chloride | | | | | | | | | | | 1.5 | | | | | | | | | | | | |
| Ferric chloride | | | | | | | | | | | | 1.5 | | | | | | | | | | | |
| GR-I-15 (butyl) | | | | | | | | | | | | | | | | 10 | | | | | | | |
| Black iron oxide | | | | | | | | | | | | | | | | | | | | | | 4 | |
| Resin #222 | | | | | | | | | | | | | | | | | | | | .8 | | | |
| Neoprene | | | | | | | | | | | | | | | | | | 8 | 8 | | | | |
| Resin #333 | | | | | | | | | | | | | | | | | | | | | | | 7 |

In Table I, all the compositions contained 100 parts by weight of polyether urethane #555, 35 parts by weight Philblack A carbon black and 0.2 part stearic acid, in addition to the other compounding ingredients listed in Table III.

EXAMPLE VII

A series of polyether-urethane gums were compounded according to the procedures described and followed in Examples IV, V and VI, cured and tested. The formulations are shown in Table II along with the test results.

TABLE II.—POLYETHER-URETHANE GUM

| Composition | A | B | C | D | E | F | G | H | I | J | K | L | M | N |
|---|---|---|---|---|---|---|---|---|---|---|---|---|---|---|
| PPG-1025-MDI gum | | | | | | | | | | | | | | 100 |
| RCD-2028-MDI gum | 100 | 100 | 100 | 100 | | | | | | | | | | |
| Terecol-MDI gum | | | | | 100 | 100 | 100 | 100 | 100 | 100 | 100 | 100 | 100 | 40 |
| EPC carbon black | | | | | | | | | 30 | 30 | 30 | 30 | | |
| HAF carbon black | 35 | 35 | 35 | 35 | 35 | 35 | 35 | 35 | | | | | 35 | 12 |
| Durez S20092 | 6 | 6 | 8 | 6 | 12 | 12 | 12 | 12 | 2 | 4 | 6 | 8 | 6 | |
| Hypalon S-2 | 3 | 3 | 3 | 3 | 3 | 3 | 3 | | | | | | 3 | |
| Zinc oxide | 5 | 5 | 5 | 5 | | | | 5 | | | | | 5 | |
| Butyl rubber | | | | 10 | | | | | | | | | | |
| Paraformaldehyde | | | | | | | 3 | | | | | | | |
| Mineral oil softener | | | | 5 | | | | | | | | | | |
| Butadiene-acrylonitrile rubber | | 5 | | | | | | | | | | | | |
| Cure time, minutes | 90 | 90 | 90 | 90 | 60 | 60 | 60 | 90 | 60 | 60 | 60 | 60 | 60 | 60 |
| Steam pressure, p.s.i. | 50 | 50 | 50 | 50 | 50 | 50 | 50 | 40 | 70 | 70 | 70 | 70 | 50 | 60 |
| 300% modulus, p.s.i. | 2,640 | 2,550 | 2,370 | 2,340 | 420 | 475 | 1,275 | 2,450 | 1,075 | 1,100 | 975 | 975 | 2,480 | 1,475 |
| Tensile strength, p.s.i. | 4,100 | 4,040 | 3,200 | 4,030 | 2,200 | 3,650 | 2,150 | 3,480 | 3,750 | 3,450 | 3,650 | 3,050 | 3,150 | 1,950 |
| Elongation, percent | 420 | 420 | 380 | 430 | 680 | 640 | 660 | 390 | 500 | 600 | 650 | 590 | 340 | 360 |
| Tensile perm. set, percent | 3 | 3 | 3 | 6 | 68 | 9 | 9 | 6 | 13 | 9 | 9 | 13 | 3 | 6 |
| Hardness (Shore A) | 68 | 68 | 67 | 66 | 62 | 65 | 56 | 71 | 64 | 65 | 63 | 62 | 70 | 65 |
| Tear strength, p.s.i. | 314 | 381 | 239 | 423 | 230 | 205 | 140 | 222 | 160 | 188 | 180 | 188 | 297 | 150 |
| MiMattia (x1000) | | | | | | | | 100 | 100 | 100 | 100 | 100 | | |
| Aged 6 hours at 300° F. | | | | | | | | | | | | | | |
| 300% modulus, p.s.i. | 1,350 | 1,580 | 1,210 | 1,120 | 1,350 | | 500 | | | | | | | 1,625 |
| Tensile strength, p.s.i. | 1,830 | 2,180 | 1,500 | 1,730 | 2,550 | 2,200 | 1,650 | 1,525 | | | | | | 140 |
| Elongation, percent | 360 | 360 | 370 | 410 | 430 | 260 | 570 | 280 | | | | | | 3 |
| Permanent set, percent | 0 | 0 | 0 | 0 | 6 | 3 | 9 | 3 | | | | | | 69 |
| Hardness (Shore A) | | | | | 58 | 64 | 54 | 56 | | | | | | |
| Goodrich flex cold | 67° 2% | 63° 2% | 55° 2% | 56° 2% | | | 78° 14% | | | | | | | |
| Goodrich flex hot | 43° 2% | 36° 4% | 44° 5% | 29° 4% | | | 54° 31% | | | | | | | |

In Table II, the PPG-1025-MDI gum is made by reacting p,p'-diisocyanato diphenyl methane (MDI) with a long-chain polypropylene ether glycol having a molecular weight of around 950 (PPG-1025). This gum has a Mooney viscosity (ML-4) of around 30 to 50 and is identified herein as PPG-1025-MDI gum.

The RCD-2028-MDI gum is a polymerization product of 1 mole of polytetramethylene ether glycol having a molecular weight of about 2650 and 1 mole of p,p'-diisocyanato diphenyl methane.

It can be seen from Table II that the resole resins of the present invention effect good cures in polyether urethane rubbers. The resultant cured polyether urethane elastomers (marked samples A through D) which were compounded with carbon black were tough rubbers with high modulus.

The liquid butadiene acrylonitrile copolymer made the processing of the polyurethane elastomer easier and did not appreciably change the properties of the cured polyurethane. The addition of butyl rubber softened the final product as did the mineral oil softener. As seen in sample D of Table II, the mineral oil plasticized polyether urethane exhibited outstanding tear strength.

The uncured polyurethane gum stock of the present invention can be stored for months and then processed in normal rubber factory equipment without appreciable scorching of the gum stock.

EXAMPLE VIII

A series of polyether-urethane gums were compounded according to the formulations shown in Table III in which various accelerators including brominated butyl rubber were used.

The resultant compositions, including some prepared with hydrochlorinated resole resins in which some methylol groups were changed to halomethyl groups, were cured and tested, the results of which are also shown in Table III.

TABLE III.—POLYETHER-URETHANE GUM

| Composition | A-1 | A-2 | A-3 | A-4 | A-5 | A-6 | A-7 | A-8 | A-9 | A-10 | A-11 | A-12 |
|---|---|---|---|---|---|---|---|---|---|---|---|---|
| Tera-PPG-MDI | | | | | | | | | | 100 | | |
| PTM urethane gum | | | | | | 100 | 100 | 100 | 100 | | 100 | 100 |
| PPG-1025-DMI | 100 | 100 | 100 | 100 | 100 | | | | | | 100 | 45 |
| Philblack A | 60 | 60 | 60 | 60 | 60 | | | | | | | |
| EPC black | | | | | | 35 | 35 | 35 | 35 | 35 | | |
| Stearic acid | 0.2 | 0.2 | 0.2 | 0.2 | 0.2 | | | | | | | |
| Durez S20092 | 8 | 10 | 12 | 12 | 12 | 8 | 8 | 8 | | 8 | 4 | 4 |
| Zinc oxide | 5 | 5 | 5 | | 5 | 5 | 5 | 5 | 5 | | 5 | 5 |
| Hypalon S-2 | 3 | 3 | 3 | 3 | 3 | 3 | | | | 3 | 3 | 3 |
| Hycar 2202 | | | | | | | | | 9 | | | |
| Durez¹ | | | | | | | 2 | | | | | |
| Accelerator A² | | | | | | | | 2 | | | | |
| Accelerator B³ | | | | | | | | | | | | |
| | Cured 90 minutes at 50 lbs. | | | | | Cured 45 minutes at 60 lbs. | | | | | | |
| 300% modulus, p.s.i. | | | | | | 2,375 | 1,525 | 1,675 | 2,580 | 925 | 1,575 | 2,675 |
| Tensile strength, p.s.i. | 2,325 | 2,375 | 2,450 | 2,450 | 2,850 | 3,775 | 2,925 | 3,875 | 3,650 | 2,725 | 2,750 | 2,875 |
| Elongation, percent | 160 | 140 | 140 | 290 | 290 | 430 | 490 | 560 | 400 | 580 | 450 | 350 |
| Permanent set, percent | 6% | 6% | 6% | 9% | 6% | 19% | | 13% | 9% | 3% | 13% | 0 |
| Shore A | 81 | 82 | 82 | 78 | 78 | 69 | 56 | 66 | 69 | 46 | 60 | 69 |
| Tear strength, p.s.i. | 125 | 133 | 111 | 38 | 221 | 184 | 134 | 173 | 161 | | 139 | 256 |
| Goodrich cold | 65° 4% | 64° 2% | 59° 2% | 84° 11% | 104° 16% | 48° 1% | 83° 15% | 139° 53% | 49° 1% | 100° | 55° 3% | 73° 2% |
| Flexometer hot | 27° Out | 40° 8% | 40° 6% | 54° 27% | 58° 32% | 43° 10% | 9° Out | 55% | 41° 10% | Out | 24° Out | 18° Out |
| DiMattia (x1,000) | | | | | | 1.5 | | 50 | 100 | 1 | 10 | 0.5 |
| TR 50: | | | | | | | | | | | | |
| −10% (°C.) | −30 | −37 | −28 | −28 | −28 | | | | | −48.5 | | |
| −50% (°C.) | −20 | −20 | −21 | −19 | −19 | | | | | −32 | | |
| −80% (°C.) | −14 | −15 | −16 | −14 | −14 | | | | | −10 | | |
| Brittle point (°C.) | −30 | −29 | −28 | −28 | −28 | | | | | −71 | | |
| Aged 6 hours at 300° F. | | | | | | | | | | | | |
| 300% modulus, p.s.i. | | | | | | 2,475 | 1,175 | 2,375 | 1,900 | | 375 | 1,800 |
| Tensile strength, p.s.i. | 1,250 | 1,450 | 1,150 | 2,000 | 1,575 | 2,850 | 1,625 | 3,125 | 2,275 | 1,175 | 1,425 | 1,825 |
| Elongation, percent | 130 | 130 | 90 | 110 | 120 | 330 | 380 | 380 | 340 | 200 | 380 | 300 |
| Permanent set, percent | 6 | 6 | 3 | 3 | 3 | 3 | 9 | 3 | 3 | 0 | 0 | 59 |
| Shore A | 81 | 80 | 81 | 70 | 79 | 61 | 55 | 65 | 61 | 57 | 49 | |

¹ Hydrochlorinated Durez S20092 with around 2% chlorine.
² Accelerator A is 1-3 dibromo (5,5 dimethyhydantoin).
³ Accelerator B is tetrabromo-phthallic anhydride.

In Table III, the Tera-PPG-MDI polyether urethane gum may be made by reacting about 2 moles of p,p'-diisocyanato diphenyl methane (MDI) with 1 mole of "Teracol 30" to form a prepolymer and thereafter reacting the prepolymer and remaining MDI with another (1) mole of PPG 1025 (polypropylene ether glycol having a molecular weight of about 950) to form the final gum, which has a Williams plasticity of about 110 to 150. The formation of the prepolymer aids in completely reacting the secondary hydroxyl groups. "Teracol 30" is a polymer of tetrahydrofuran having an average weight of 2600 to 3000 terminated with primary hydroxyl groups.

The resultant cured polyether urethane using the above gum (composition A-10) exhibited excellent low temperature properties, the brittle point being as low as $-71°$ C.

In Table III a polyether-urethane gum, identified herein as PTM urethane gum was made by mixing 4 moles of polytetramethylene ether glycol having a molecular weight of 3000 with 1 mole of ricinoleyl alcohol and 5 moles of p,p'-diisocyanato diphenyl methane and allowing the mixture to stand for about 2 hours at 115° C. in a closed container in the presence of an iron acetonyl acetonate reaction catalyst to form the final gum which has a Mooney viscosity (ML-4) of about 40 to 60.

The term "parts" wherever used in the specification or claims means parts by weight. When the term "parts" is used to describe the amounts of ingredients other than the polymerization product to be cured, it means parts by weight per 100 parts of such polymerization product. Whenever percentages are used in the specification and claims hereof, the percentages are by weight unless specifically indicated otherwise.

It will be understood that the above description is given for purposes of illustration rather than limitation, that slight changes in the amounts and chemical compositions of the materials described herein will become apparent after reading this disclosure, and that, in accordance with the provisions of the patent statutes, variations and modifications of the specific methods and compositions disclosed herein may be made without departing from the spirit of the invention.

Having described our invention, we claim:

1. A method of making polyalkylene ether urethane compounds comprising reacting a long-chain linear polyalkylene ether glycol having terminal hydroxyl groups and a molecular weight of at least 600 with an organic polyisocyanate selected from the class consisting of aliphatic and aromatic polyisocyanates having two to three functional isocyanate groups per molecule to form a linear thermoplastic polyalkylene ether urethane, mixing 100 parts of said polyalkylene ether urethane with 2 to 15 parts of a 2,6-dimethylol-3,5-dialkyl substituted phenol resole having meta aliphatic substituents with 2 to 20 carbon atoms, shaping the mixture, and thereafter heating the mixture to obtain an elastic vulcanized article.

2. A method comprising mixing 100 parts of polyalkylene ether urethane with 2 to 15 parts of a resinous resole-condensation product of formaldehyde and 2,6-dimethylol-3,5-dialkyl phenol having alkyl meta substituents with 2 to 20 carbon atoms, shaping the mixture, and thereafter heating the shaped mixture at a temperature of 200° to 400° F. for an inversely related time of a few minutes to 2 hours to obtain an elastic vulcanized article, said polyalkylene ether urethane comprising a long-chain thermoplastic polymerization product of a long-chain linear hydroxy terminated polyalkylene ether glycol and an aromatic diisocyanate.

3. A method of making polyalkylene ether urethane rubber articles comprising halogenating a resinous resole condensation product of formaldehyde and 2,6-dimethylol-3,5-dialkyl substituted phenol having alkyl meta-substituents with 2 to 20 carbon atoms to form a curing resin containing 0.5 to 2% by weight of a halogen atom, mixing 2 to 15 parts of the curing resin with 100 parts of polyalkylene ether urethane, shaping the mixture, and thereafter heating the shaped mixture to obtain an elastic vulcanized article, said polyalkylene ether urethane, comprising a long-chain thermoplastic polymerization product of a long-chain linear hydroxy terminated polyalkylene ether glycol and an aromatic diisocyanate.

4. A polyalkylene ether urethane vulcanizate comprising 100 parts of polyether urethane vulcanized with 2 to 15 parts of a resinous resole condensation product of formaldehyde and 3,5-dialkyl phenol having alkyl meta meta substituents with 2 to 8 carbon atoms, said urethane comprising a long-chain thermoplastic polymerization product of a long-chain linear polyalkylene ether glycol and an aromatic diisocyanate.

5. An elastic polyalkylene ether urethane vulcanizate comprising 100 parts of a linear thermoplastic urethane reaction product of a long-chain polyalkylene ether glycol and an aromatic diisocyanate vulcanized with 2 to 15 parts of a reaction product of formaldehyde and 3,5-diisopropyl phenol.

6. A polyalkylene ether urethane vulcanizate comprising 100 parts of a thermoplastic linear polyalkylene ether urethane vulcanized with 2 to 15 parts of a resole condensation product of 2,6-dimethylol-3,5-dialkyl substituted phenol having alkyl meta substituents with 2 to 20 carbon atoms, said condensation product having some of its methylol groups converted to halomethyl groups ($-CH_2X$), where X is a halogen atom, the halogen comprising 0.5 to 2% of the weight of said condensation product, said polyalkylene ether urethane comprising a long-chain thermoplastic polymerization product of a long-chain linear polyalkylene ether glycol and an aromatic diisocyanate.

7. A polyalkylene ether urethane vulcanizate as defined in claim 6 vulcanized with said condensation product and with 20 to 70 parts of reinforcing filler, said polyalkylene ether urethane comprising 50 to 70% of the total weight.

8. A vehicle tire having a tread comprising a polyalkylene ether urethane composition vulcanized with reinforcing filler and an oil-soluble resole condensation product of formaldehyde and 2,6-dimethylol-3,5-dialkyl substituted phenol having alkyl meta substituents with 2 to 20 carbon atoms, said polyalkylene ether urethane comprising a long-chain thermoplastic polymerization product of a long-chain linear polyalkylene ether glycol and an aromatic diisocyanate and forming 50 to 70% of the total weight, said condensation product forming 1 to 10% of said total weight, and said filler forming 10 to 30% of said total weight.

9. A method as defined in claim 1 wherein the polyalkylene ether urethane is formed from about 0.9 to 1.2 equivalent weights of the polyisocyanate and one equivalent weight of the polyalkylene ether glycol.

References Cited in the file of this patent

UNITED STATES PATENTS

| | | |
|---|---|---|
| 2,732,368 | Shepard | Jan. 24, 1956 |
| 2,803,620 | Mills | Aug. 20, 1957 |
| 2,813,843 | Shepard | Nov. 19, 1957 |
| 2,850,424 | Finelli et al. | Sept. 2, 1958 |
| 2,918,448 | Viohl | Dec. 22, 1959 |

FOREIGN PATENTS

| | | |
|---|---|---|
| 580,524 | Great Britain | Sept. 11, 1946 |
| F14136 IVb/39b | Germany | June 7, 1956 |

OTHER REFERENCES

Zimmerman et al.: "Handbook of Material Tradenames," 1953 edition, Industrial Research Service, Dover, N.H., page 98.

Martin: "Chemistry of Phenolic Resins," published 1956, John Wiley and Sons, New York, New York, pages 206, and 217-221.